June 15, 1926.

S. LEVY 1,589,184

POCKET CLOTH MEASURING MACHINE

Filed May 26, 1923   2 Sheets-Sheet 1

WITNESSES

INVENTOR
SAMUEL LEVY
BY
ATTORNEYS

June 15, 1926.  
S. LEVY  
1,589,184  
POCKET CLOTH MEASURING MACHINE  
Filed May 26, 1923   2 Sheets-Sheet 2
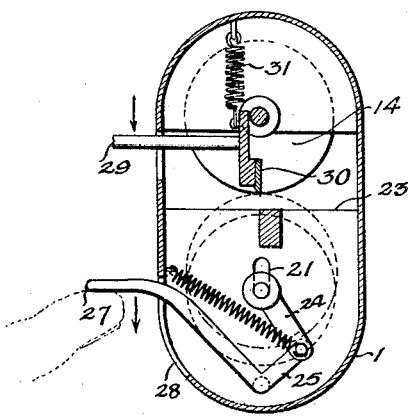
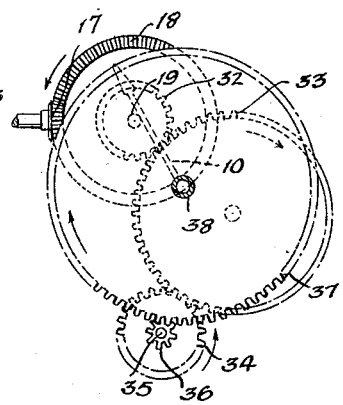
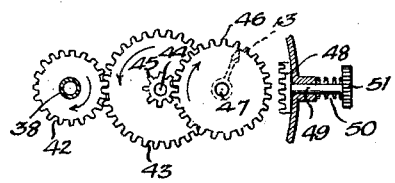
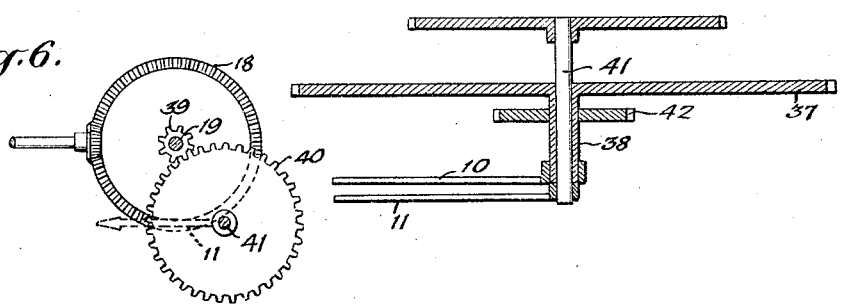
WITNESSES  
INVENTOR  
SAMUEL LEVY  
ATTORNEYS Patented June 15, 1926.

1,589,184

UNITED STATES PATENT OFFICE.

SAMUEL LEVY, OF PATERSON, NEW JERSEY.

POCKET-CLOTH-MEASURING MACHINE.

Application filed May 26, 1923. Serial No. 641,725.

This invention relates to cloth measuring devices and particularly to an improved device which may be carried in the hand and has for an object to present an accurately operating measuring device which may be applied to a strip of cloth at any point and readily moved along the cloth by hand or have the cloth move therethrough.

Another object of the invention is to provide a cloth measuring device which is sufficiently small to carry in the hand and to be operated while being carried by the hand.

A still further object of the invention is to provide a cloth measuring apparatus which will accurately measure parts of yards or larger denominations.

An additional object is to provide a measuring apparatus in which means are provided for indicating a large number of yards measured and for indicating at the same time a small number of yards measured or a fraction thereof, the two indicating devices acting together.

In the accompanying drawings—

Figure 4 is a transverse sectional view through Figure 3, approximately on line 4—4.

Figure 5 is a fragmentary sectional view showing a driving pinion and a train of gears directly operated thereby.

Figure 6 is a fragmentary view showing the driving pinion illustrated in Figure 5 with another train of gears embodying certain features of the invention.

Figure 7 is a view showing a third train of gears and re-setting mechanism, embodying certain features of the invention.

Figure 8 is an enlarged fragmentary sectional view showing two pointers and connected gears.

Figure 1:
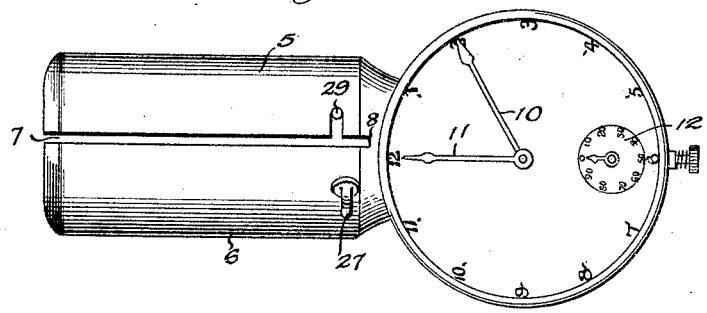
Figure 1 is a plan view of a measuring device, disclosing an embodiment of the invention.

Referring to the accompanying drawings by numeral, 1 indicates a casing which carries a dial plate 2 having certain graduations thereon hereinafter described in a protecting glass cover 3. The casing 1 merges into a neck portion 4 which in turn merges into sections 5 and 6 with a slot or opening 7 therebetween. The invention is designed particularly for measuring cloth in stores and the device is so constructed that the cloth may be inserted into slot 7 any suitable distance, as for instance, to near the inner end 8 of the slot and then pulled through the device or held while the device is moved along. This action will cause the device to operate and indicate on the dial 2 the amount of cloth measured.

Figure 3:
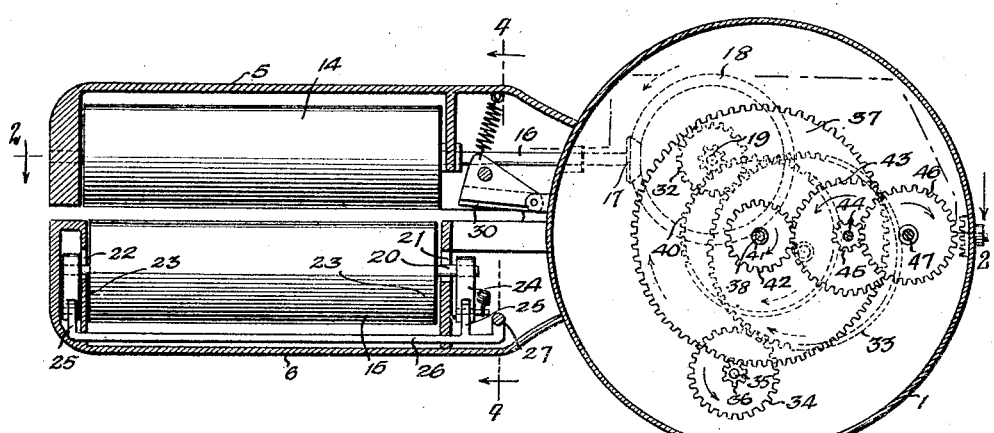
Figure 3 is a sectional view through Figure 2, approximately on line 3—3.

In connection with the dial 2 it will be observed that legends 9 are provided which are in the form of numbers and indicate the measuring of from one to twelve yards. When observed in connection with hand 10, the hand or pointer 11 is designed to indicate fractions of a yard while the auxiliary dial face 12 co-acts with the pointer 13 for indicating the total of several pieces of cloth measured by the device or where more than twelve yards has been measured at one time. In the sections 5 and 6 are arranged rollers 14 and 15, roller 14 acting as a driving roller while roller 15 acts as the friction roller. A shaft 16 is rigidly connected with roller 14 and carries a driving pinion 17 at one end, said pinion continually meshing with a bevel gear 18 rigidly secured to the shaft 19. The friction roller 15 is connected with an axle or shaft 20 which extends through suitable slots 21 and 22 in the respective walls 23. Near each end a link 24 is journaled on the shaft 20, said link being pivotally connected with the respective extensions 25 of the bar 26, which bar is formed with a hand operated lever 27 extending through the slot 28 (Figure 4) in the casing. By this arrangement as shown in Figures 3 and 4, whenever the parts are in the position shown in Figure 4, the cloth may be readily inserted or removed. After the cloth has been inserted preparatory to measuring the same, lever 27 is moved downwardly until the toggles formed by members 24 and 25 substantially align. By this movement, the roller 15 is not only moved over to near the roller 14 for pinching the cloth against roller 14 but the roller 15 is also substantially locked in its advanced position. After the desired amount of cloth has been pulled through the machine as indicated by the respective hands 10, 11 and 13, the movement of the cloth is stopped and the pin 29 moved for swinging the cutter 30 and thereby causing the cloth to be nitched. This movement is carried out against the action of the retractile spring 31 whereby as soon as the knife 30 has functioned, it will automatically move back to its former position when pin 29 is released. By cutting the cloth slightly in this manner, it is properly marked so that the salesman may then tear or cut the cloth at the desired point.

Motion is transmitted from the roller 14 through the pinion 17 to the various trains of gears shown in Figures 2, 3 and 5 to 8 whereby the respective hands 10, 11 and 13 are driven. The various trains of gears are arranged so that the particular train shown in Figure 5 will act to drive the pointer 10 while the train of gears shown in Figure 6 will act to drive the pointer 11 and the train of gears shown in Figure 7 will drive the pointer or hand 13.

Figure 2:
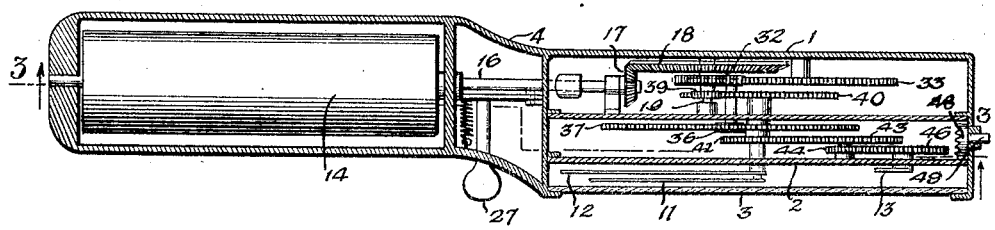
Figure 2 is a longitudinal vertical sectional view through a measuring apparatus, disclosing an embodiment of the invention, the section being taken approximately on line 2—2 of Figure 3.

As indicated particularly in Figures 2 and 5, power is transmitted from pinion 17 to the gear 18 and from thence to shaft 19. A large pinion 32 is secured rigidly to shaft 19 and is rotated thereby, said pinion continually meshing with the gear wheel 33 and this gear in turn meshes continually with a small gear 34 rigidly secured to the shaft 35 which also carries a small pinion 36 to which it is secured. The pinion 36 meshes continually with the large gear 37, which large gear is provided with a sleeve or hollow shaft 38 which is rigidly secured to the hand or pointer 10. In respect to the hand or pointer 11, power is transmitted from the bevel gear 18 to shaft 19 and from thence to a small pinion 39 which continually meshes with the gear 40, which gear is rigidly secured to a shaft 41 and said shaft extends through the hollow shaft 38 and has the hand 11 secured thereto near the end thereof. It will be understood that the various gears just described are proportioned in respect to the roller 14 to drive the pointers 10 and 11 as heretofore mentioned, namely, pointer 11 to indicate fractions of a yard while the pointer 10 will indicate one yard as it moves from one legend 9 to the next legend.

In order to operate the hand or pointer 13, a gear wheel 42 is rigidly secured to the hollow shaft 38, said gear wheel meshing with a gear wheel 43 rigidly secured to the shaft 44, which shaft has a small pinion 45 also rigidly secured thereto. The pinion 45 is continually meshing with the gear wheel 46 carried by the shaft 47, which shaft extends through the dial plate 2 and is rigidly secured to the pointer 13. These gears are properly proportioned in respect to each other and to the other driving mechanism to operate the pointer 13 at a proper speed in respect to the speed of the pointers 10 and 11.

Any time it is desired to move the parts back to zero or the starting point, the gear wheel 48 (Figure 7) which is rigidly secured to the shaft 49, is pushed inwardly until it meshes with the gear wheel 46 and then is rotated until the various pointers assume the desired position. A spring 50 acts on the head 51 for normally holding the gear wheel 48 out of operative position as indicated in Figure 7.

What I claim is:—

A cloth measuring machine, comprising a casing having a slot, a fixed rotatable roller arranged in the casing near the slot, a movable rotatable roller arranged in the casing near said slot, a journal pin for said movable roller, means connected with said movable roller and extending to the exterior of the casing adapted to move the movable roller to a point near the fixed roller and away from the fixed roller when manually actuated, said means including a pair of arms pivotally mounted on the journal pin of the movable roller, a bar extending the full length of said movable roller formed with a pair of arms, said arms being pivotally connected with the first mentioned arms and a projection extending from said bar to the exterior of said casing, a dial carried by said casing, a pointer arranged adjacent said dial, and means for connecting the pointer with the fixed roller, said means acting to transmit movement from the fixed roller to the pointer whereby the pointer will be moved in proportion to the rotation of the fixed roller.

SAMUEL LEVY.